No. 662,600. Patented Nov. 27, 1900.
J. E. LENHULT.
WASHER.
(Application filed Jan. 29, 1900.)
(No Model.)
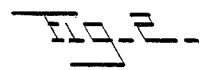
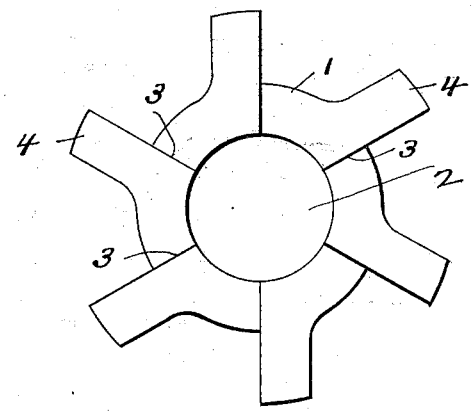
Witnesses.
Edwin M Clark
Wallace E Clark
Inventor.
John E Lenhult
by George E Hall
Attorney.

UNITED STATES PATENT OFFICE.

JOHN E. LENHULT, OF LEETES ISLAND, CONNECTICUT, ASSIGNOR OF ONE-HALF TO JOSEPH MATTSON, OF BRANFORD, CONNECTICUT.

WASHER.

SPECIFICATION forming part of Letters Patent No. 662,600, dated November 27, 1900.

Application filed January 29, 1900. Serial No. 3,108. (No model.)

*To all whom it may concern:*

Be it known that I, JOHN E. LENHULT, a citizen of the United States, residing at Leetes Island, in the county of New Haven and State of Connecticut, have invented certain new and useful Improvements in Washers, of which the following is a specification, reference being had therein to the accompanying drawings.

My invention relates to improvements in washers, and refers more especially to toothed washers for preventing the accidental unscrewing of tie-bolt nuts upon rail-bonds. Owing to the continuous jar and strain upon a tie-bolt the nuts frequently jar loose and drop off. To overcome this difficulty, I have designed the washer hereinafter described, the object of which is to form the same with teeth which will embed themselves into the tie-plate or nut and prevent the same from becoming loosened and, further, to provide means connected with said washer whereby the same will be held against rotation upon the bolt-body.

The washer can be used with any bolt or nut, and therefore I do not limit myself to its use with a rail-bond tie-bolt.

To these ends my invention consists in a washer substantially as hereinafter shown and described, and more particularly pointed out in the claims.

Referring to the drawings, Figure 1 is an elevation of my improved washer, and Fig. 2 is a plan view thereof.

The washer is constructed with a body portion 1, having a circular hole 2 therethrough and upon each side of which are cut a number of face-teeth 3. A plurality of arms 4 project radially from the said body portion, so as to form a continuation of the said teeth, as shown by the drawings. The washer is placed upon the bolt between the nut and the tie-plate and when being tightened the teeth slide over the surface against which they come in contact; but when it is attempted to unscrew the nut the teeth immediately cut into the adjoining surface and there hold the nut against accidental displacement. Of course the nut can be removed by a wrench or other manual means without difficulty, as the teeth do not take hold with sufficient grip to prevent the unscrewing of the nut manually. The arms 4, which are a continuation of the side teeth, project outwardly far enough from the bolt to engage with the bottom of the tie-plate and prevent the rotation of the washer upon the bolt.

Having described my invention, what I claim as new, and desire to secure by Letters Patent, is—

1. A washer for the purpose substantially as described, having radial arms projecting therefrom and provided with teeth upon each side thereof, the face of said teeth being in line with one side of the said projecting arms, substantially as described.

2. A washer for the purpose substantially as described, having the circular body portion 7, with teeth 3 upon each side thereof; and the integral arms 8 projecting radially therefrom and forming a continuation of the said side teeth, substantially as described.

In testimony whereof I affix my signature in presence of two witnesses.

JOHN E. LENHULT.

Witnesses:
GEORGE E. HALL,
WALLACE S. MOYLE.